US010753346B1

United States Patent
Sherman et al.

(10) Patent No.: US 10,753,346 B1
(45) Date of Patent: Aug. 25, 2020

(54) CONTROL SYSTEM FOR A MICROWAVE ELECTROTHERMAL THRUSTER

(71) Applicant: Northrop Grumman Systems Corporation, Falls Church, VA (US)

(72) Inventors: Daniel R. Sherman, Torrance, CA (US); Edward Lukas, Encino, CA (US); Brandon Quon, Gardena, CA (US); Kurt Shaffer, Hermosa Beach, CA (US); Jonathan H. Dang, Redondo Beach, CA (US); Matthew J. Pirih, San Pedro, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 379 days.

(21) Appl. No.: 15/679,311

(22) Filed: Aug. 17, 2017

(51) Int. Cl.
  *F03H 1/00* (2006.01)
  *B64G 1/40* (2006.01)
  *B64G 1/26* (2006.01)
  *H05H 1/46* (2006.01)

(52) U.S. Cl.
  CPC ............ *F03H 1/0018* (2013.01); *B64G 1/26* (2013.01); *B64G 1/402* (2013.01); *B64G 1/405* (2013.01); *F03H 1/0012* (2013.01); *F03H 1/0093* (2013.01); *H05H 1/46* (2013.01); *H05H 2001/463* (2013.01)

(58) Field of Classification Search
  CPC .... F03H 1/0012; F03H 1/0081; F03H 1/0087; F03H 1/0093; F03H 1/0018; B64G 1/402; B64G 1/405
  See application file for complete search history.

(56) References Cited

U.S. PATENT DOCUMENTS

| 5,770,143 A | * | 6/1998 | Hawley | B29C 33/56 219/746 |
| 2007/0295009 A1 | * | 12/2007 | Calabro | B64G 1/402 60/641.15 |
| 2012/0135698 A1 | * | 5/2012 | Yan | H03H 7/24 455/127.5 |

OTHER PUBLICATIONS

Blum "Evaluation and Optimization of an 8-GHz Microwave Electrothermal Thruster" (Year: 2009).*
Celerity "8100 Series High Flow Mass Flow Controllers/Meters" (Year: 2005).*
National Instruments "Designing a Computer-Based Control System for an Electromagnetic Launcher Facility Using NI Hardware and LabVIEW Software" (Year: 2008).*
Montgomery "Solid-State PA's Battle TWTAs for ECM Systems" (Year: 2017).*
Agilent/HP "8684A Signal Generator Operating and Service Manual" (Year: 1984).*
Rodwell "Lecture 16 Power Combiners" (Year: 2016).*

(Continued)

*Primary Examiner* — Gerald L Sung
*Assistant Examiner* — William L Breazeal
(74) *Attorney, Agent, or Firm* — McCracken & Gillen LLC (57) ABSTRACT

A microwave electrothermal thruster (MET) and its control system is disclosed and claimed. The MET control system uses a dielectric resonator oscillator (DRO) in series with a GaN MMIC-based Solid State Power Amplifier (SSPA) to generate microwave energy, transfer it to a thrust chamber, and heat a propellant that exits a nozzle, providing thrust. The control system uses feedback to provide autonomous control of the MET. A wide variety of propellants may be used, including, for example, hydrazine, ammonia, and water.

18 Claims, 8 Drawing Sheets

(56) References Cited

OTHER PUBLICATIONS

Bilen "CubeSat Microwave Electrothermal Thruster (CµMET)" (Year: 2013).*
National Instruments "Using LabVIEW to Create Open Mission Control, a Software System for Student Spacecraft" (Year: 2012).*
Microwave Dynamics "DRO 1000" (Year: 2006).*
Ariane Group "Pressure Regulator for Ion Space Propulsion Systems" (Year: 2005).*
Abaimov "Preliminary Testing of a 17.8-Ghz Microwave Electrothermal Thruster for Small Spacecraft" (Year: 2015).*

* cited by examiner

CONTROL SYSTEM FOR A MICROWAVE ELECTROTHERMAL THRUSTER

BACKGROUND

The invention relates generally to advanced propulsion technologies and more particularly to control systems for microwave electrothermal thrusters.

Launches of small and miniaturized satellites such as CubeSat are occuring more and more frequently. A CubeSat is made of up multiples of 10×10×10 cm cubic units that have a mass of no more than 1.33 kg per unit. Because of their small size, propulsion systems that rely on large portions of a space vehicle's size, weight, and power allowances are not suitable for this market. Solid rockets, for example, are less efficient and lack an ability to relight. Chemical rockets have complex plumbing and delicate components, which are generally not suited for small missions. Cold-gas thrusters are inefficient and do not provide enough change in velocity (delta-V) for extended missions. Hall-effect thrusters (HET) require large power levels whle arcjets have electrodes in the flow path of the propellant that can erode.

Advanced propulsion technologies, such as electric propulsion, are commonly used for station keeping on commercial communications satellites and for primary propulsion on some scientific missions because they have significantly higher values of specific impulse (Isp). Station-keeping refers to maneuvers that are taken by an object in orbit to maintain the orbit or its relative position to one or more other orbiting objects. For example, small impulses from the propulsion system are used for precise positioning of spacecraft relative to each other, such as a space telescope that is formation flying with an occulting disk for a planet finding mission.

A microwave electrothermal thruster (MET) uses microwave energy to heat up a gaseous propellant to convert it into plasma. The plasma expands within a resonate cavity in the MET. As the pressure increases, the plasma is expelled through a nozzle, creating thrust. Previously developed versions of microwave propulsion have relied upon one of two methods for introducing the microwave energy to the propellant: 1) beaming the microwaves from ground stations to the flying propulsion system, or 2) use of an onboard klystron, magnetron, or traveling wave tube amplifier (TWTA) connected to the thrust chamber. These solutions do not meet the size, weight and power limitations of small and miniturized satellites. Generally, these other solutions are incredibly inefficient and not worth the cost to implement.

Thus, there is a need for an improved MET having a small packaging volume and mass. There is a further need for a MET control system that provides high values of specific impulse (Isp) with low power requirements and precise and automatic control.

SUMMARY

The invention in one implementation encompasses a control system for a simplified microwave electrothermal thruster for a small or miniaturized satellite that provides automatic control of microwave generation and propellant flow. An extremely efficient transfer of energy from microwaves to propellant allows small impulses to provide precise control of the satellite. A high specific impulse power results in propellant mass savings at low power levels.

In an embodiment, the invention encompasses a control system for a microwave electrothermal thruster (MET) including a propellant system for providing propellant to the MET at a selected pressure and flow rate; a microwave generation system for providing microwave energy to the MET at a selected power; and an electronics control board for controlling the propellant and microwave generation systems based on system parameters and feedback from the propellant and microwave generation systems.

In a further embodiment, the invention encompasses a control system for a microwave electrothermal thruster (MET) including a propellant system having a propellant tank and a flow meter coupled to the propellant tank for measuring the flow rate of propellant as it is supplied to the MET; a microwave generation system having an oscillator for generating microwaves, an integrated microwave assembly (IMA) for increasing power of the microwaves from the oscillator then sending the microwaves to the MET and a sensor for monitoring microwave power sent to the MET; and an electronics control board for monitoring the flow meter and the sensor to control the operation of the MET.

In either of the above embodiments, the propellant system may include a proportional valve for controlling a flow rate of the propellant according to a control signal from the electronics control board and a flow meter for measuring the flow rate of the propellant and providing a control signal to the electronics control board.

In any of the above embodiments, the control system is located on a satellite and the electronics control board provides autonomous control of the MET to adjust a position of the satellite.

In any of the above embodiments, the propellant system may include a pressure regulator and a proportional valve for controlling the rate of flow of the propellant between the tank and the flow meter.

In any of the above embodiments, the microwave generation system may include a variable attenuator; a driver amp; and an attenuator.

In any of the above embodiments, the microwave generation system includes a circulator for receiving microwave energy from the IMA and transferring it to the MET and for receiving reflected power from the MET and transferring it to the sensor.

In any of the above embodiments, the oscillator is a dielectric resonator oscillator (DRO).

In any of the above embodiments, the DRO generates microwaves having a frequency of approximately 20 GHz.

In any of the above embodiments, the IMA includes a plurality of GaN MMIC-based (Monolithic Microwave Integrated Circuit) Solid State Power Amplifiers (SSPAs).

In any of the above embodiments, the IMA includes a first SSPA for receiving an and providing an amplified output; a first Wilkinson combiner receiving an input from the first SSPA and providing two outputs; second and third SSPAs for receiving inputs from the first Wilkinson combiner and providing amplified outputs; and a second Wilkinson combiner for receiving inputs from the second and third SSPAs and providing an amplified output.

In any of the above embodiments, the IMA increases the power of the microwaves to approximately 40 dBm.

In any of the above embodiments, the IMA is cooled by propellant as it exits the propellant tank.

In any of the above embodiments, the propellant is a pressurized gas. Further, the propellant may be hydrazine, ammonia, water or helium.

In an embodiment, the invention encompasses a microwave electrothermal thruster (MET) including an upper chamber further comprising a plurality of propellant inlets and a nozzle; a lower chamber separated from the upper chamber by a separation plate and further comprising a microwave energy inlet; and any of the control systems as discussed above.

In another embodiment, the invention encompasses a satellite including a microwave electrothermal thruster (MET) and any of the control systems as discussed above.

BRIEF DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention. Although specific dimensions of various features have been given, these are representative so as to illustrate aspects of the invention.

Advanced propulsion technologies, such as electric propulsion, are commonly used for station keeping on commercial communications satellites and for primary propulsion on some scientific missions because they have significantly higher values of specific impulse (Isp).

The inventive microwave electrothermal thruster (MET) operates on a different principle from most electric propulsion systems. In the MET, microwaves are used to heat the propellant in a resonant cavity. The propellant is then expelled through a nozzle as in a traditional rocket to create thrust. The extremely efficient transfer of energy from microwaves to the propellant, as well as the high temperatures involved, produces a specific impulse much larger than for conventional chemical thrusters. The higher specific impulse for MET propulsion provides a propellant mass savings when used for typical maneuvers, such as station-keeping. It does not require the large power levels associated with Hall-effect thrusters (HETs), and can be added on to an existing hydrazine system. Many different propellants may be used in a MET, including hydrazine, ammonia, and water.

Figure 1:
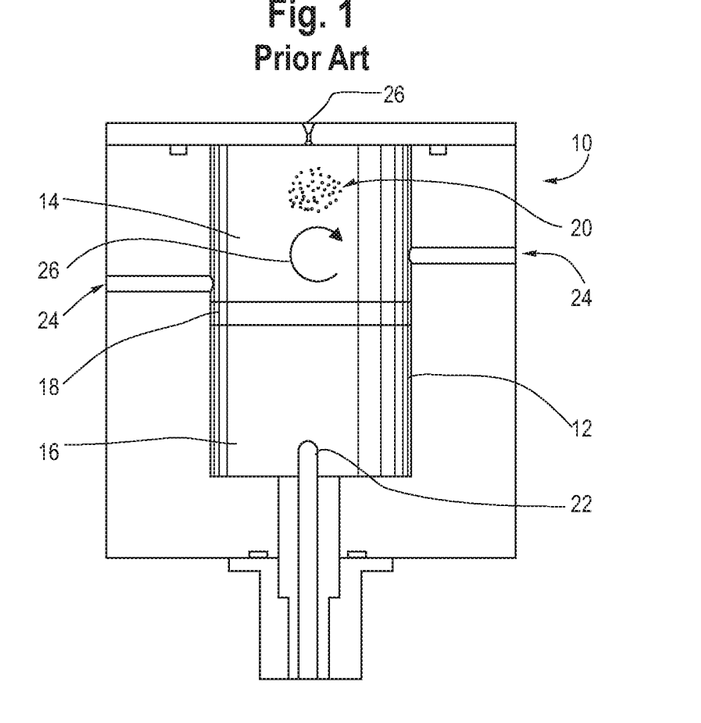
FIG. 1 is a schematic diagram of a MET according to the present invention.

A schematic diagram of a MET 10 illustrating the principles of operation is shown in FIG. 1. A cavity 12 is divided into an upper chamber 14 and a lower chamber 16 divided by a separation plate 18. Plasma 20 is created in upper chamber 14 using microwave power generated by antenna 22 in lower chamber 16. Propellant is pumped tangentially into upper cavity 14 through propellant inlet 24. This creates a vortex flow as represented by arrow 26. The microwave energy creates an electric field having a resonant frequency concentrated near nozzle 26. As propellant is injected into upper chamber 14, the plasma ignites next to the nozzle. In appropriate pressure conditions, the plasma is self-sustaining and stabilized by vortex flow 26 caused by the continued injection of propellant. This turns the cavity into a pressure chamber and thrust is created when propellant exits from nozzle 26.

Figure 2:
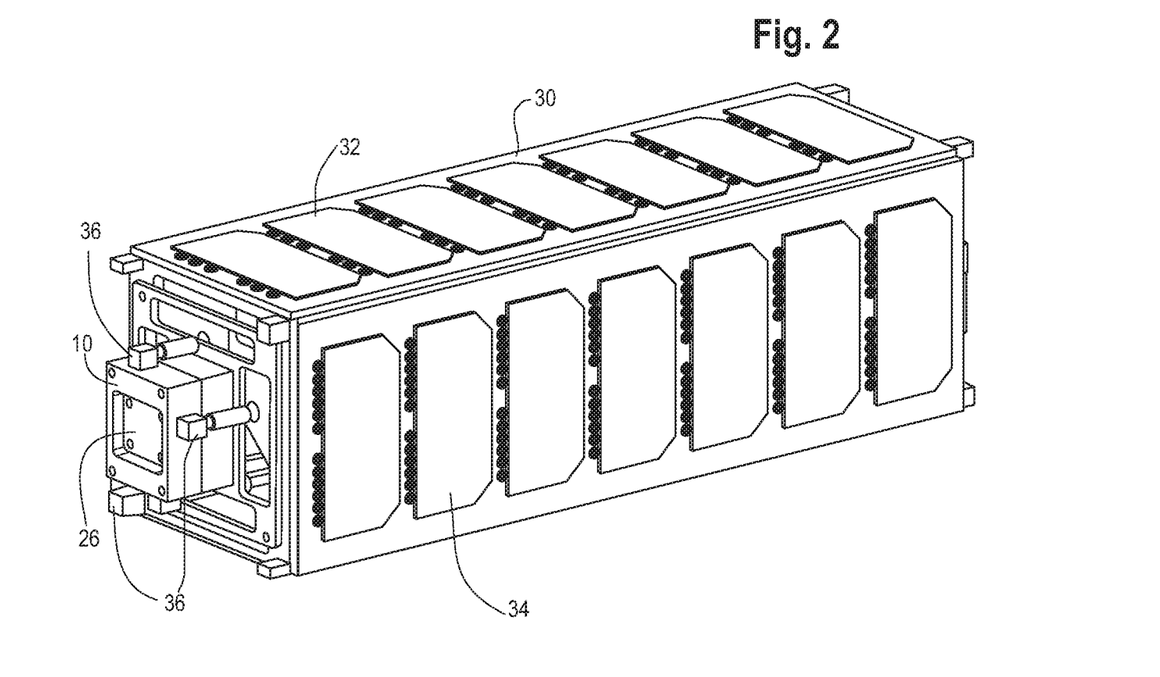
FIG. 2 depicts a satellite box for use with a MET according to the present invention.

FIG. 2 depicts a satellite for use with MET 10. MET 10 is mounted at one end of satellite housing 30 so that nozzle 26 provides thrust. Additional thrusters can be installed in any location where additional thrust might be needed. Furthermore, thrusters could optionally be attached with a gimbal such that the thrust direction can be modified in flight. Satellite housing 30 is provided with solar panels, representatively indicated at 32 and 34, that are used to collect solar energy to recharge an onboard battery. Propellant inlet interfaces, indicated at 36, are used to allow the propellant to enter the thrust chamber.

Figure 3A:
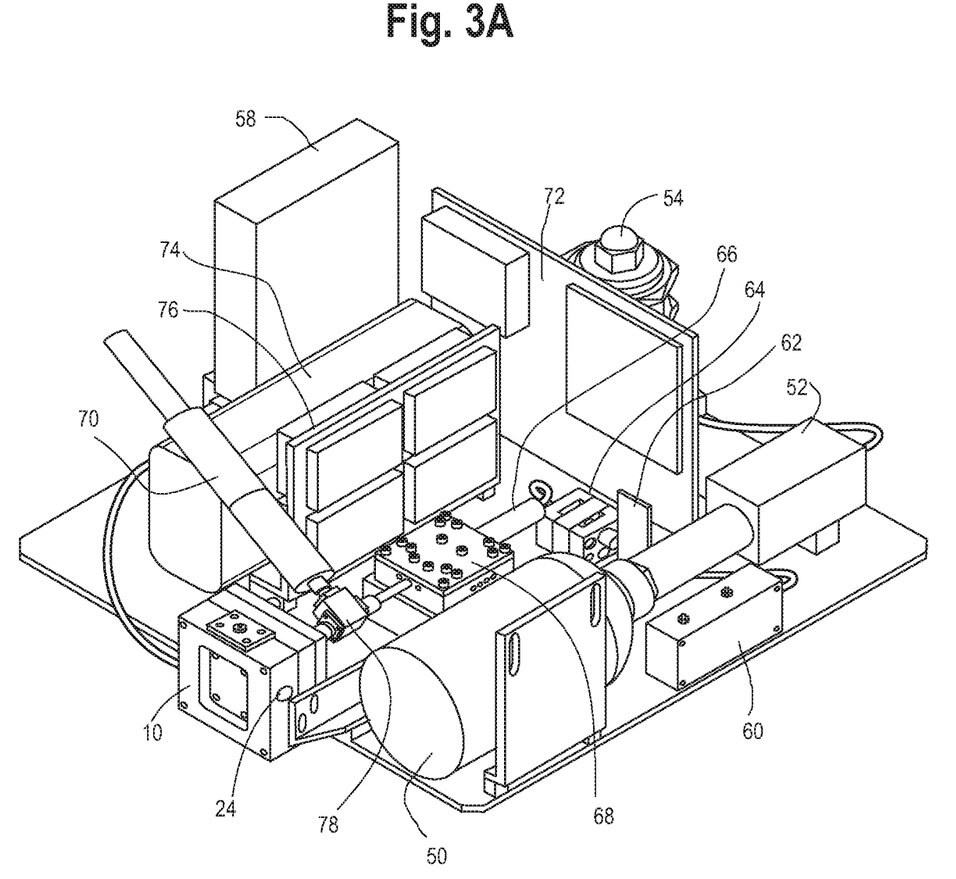
FIGS. 3A and 3B are more detailed diagrams of an MET control system.
Figure 3B:
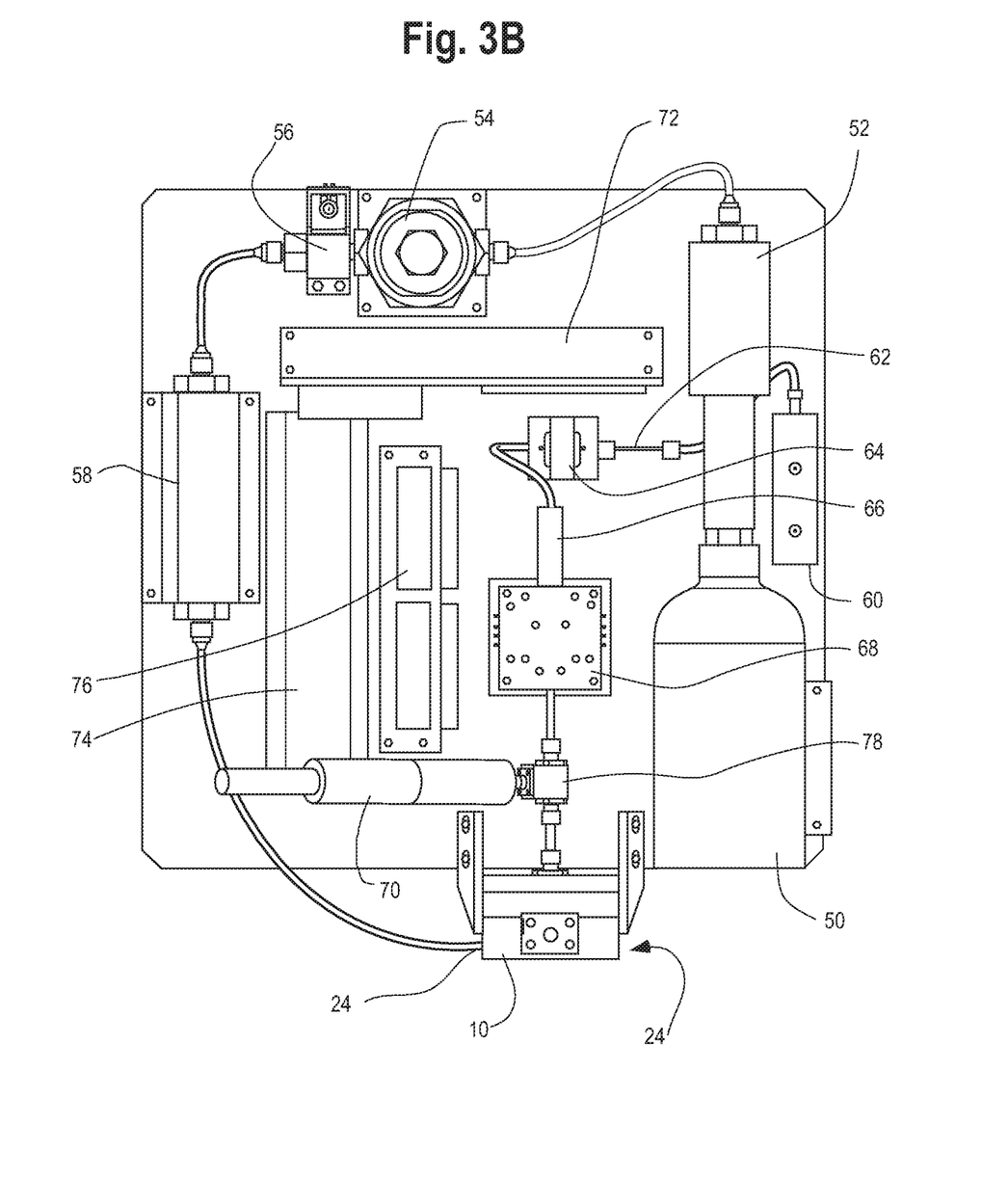

A more detailed diagram of an embodiment of a MET control system according to the invention is shown in FIGS. 3A and 3B. In order to clearly show the connections between the elements, FIG. 3A depicts a perspective view while FIG. 3B depicts a top view. Reference numbers for like elements are the same in both figures. FIGS. 3A and 3B depict a MET control system configured with a number of user interface elements that would be used during development and testing of the system.

Tank 50 holds propellant at approximately 3000 PSI (pounds per square inch). Fill valve 52 allows the tank to be filled with propellant from an external gas source. From there propellant passes through a pressure regulator 54 which decreases the pressure to approximately 100 PSI. Proportional valve 56 controls the flow rate of the propellant which then passes through flow meter 58 after which it is injected into MET 10 through propellant inlets 24 on either side as shown. For clarity of illustration, a propellant line from flow meter 58 to MET 10 is only shown connected to one of inlets 24. Although two inlets 24 are shown, any number of propellant inlets could be provided.

Dielectric resonator oscillator (DRO) 60 generates microwaves at a frequency of approximately 20 GHz with 7 dBm (decibel-milliwatts) of power. Although the invention is disclosed with a DRO, any oscillator capable of generating radio waves at microwave frequencies could be used. The DRO is connected to a variable attenuator 62 which controls the RF power with 3-30 dB range of attenuation. Variable attenuator 62 is connected to driver amp 64 which is generally used to increase the power of the signal from the DRO. Integrated microwave assembly (IMA) 68, a GaN MMIC-based Solid State Power Amplifier (S SPA) receives the microwaves from attenuator 66 for additional amplification. From IMA 68, the microwaves pass through circulator 78 before entering lower chamber 16 of MET 10 through antenna 22 as shown in FIG. 1. Reflective power meter 70 measures microwave power to provide control input.

Several electronics boards 72 provide voltage and power regulation as well as other control features for the MET 10 as described in more detail in connection with FIG. 4. Although multiple boards are shown, any number could be used as needed. Power is supplied by battery 74. The electronic display boards, shown at 76, provide feedback to the operator during ground testing. Display boards 76 are shown with four displays as described below in connection with FIG. 4, but any number of displays could be used. In an embodiment, the four displays 76 show battery voltage, IMA operating temperature, reflected power, and input power.

Figure 4:
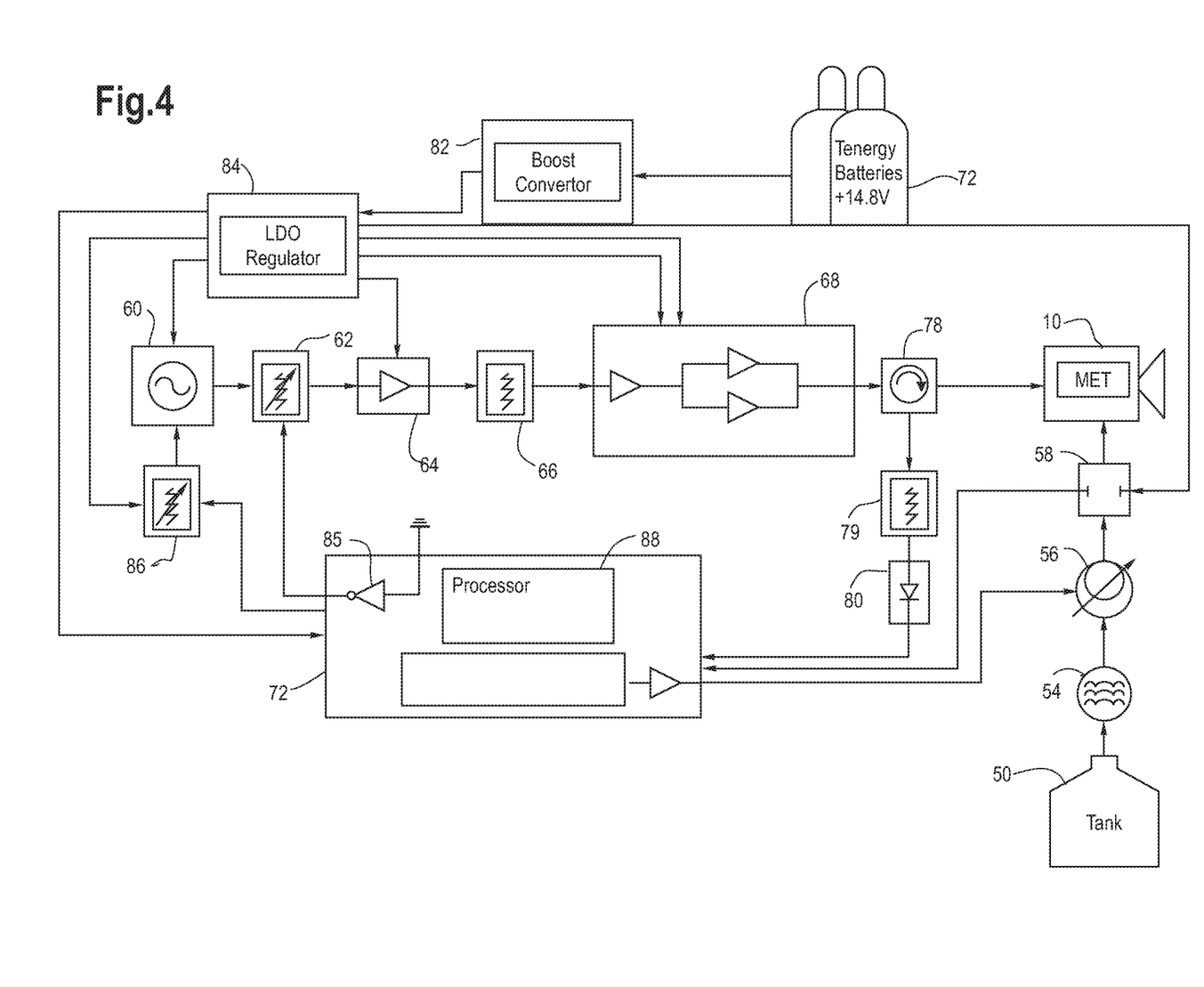
FIG. 4 is a schematic diagram of an MET control system.

A schematic diagram of a MET control system for use in a satellite is shown in FIG. 4. Corresponding elements to those shown in FIGS. 3A and 3B have the same reference numbers. A propellant system includes tank 50 supplies propellant at approximately 3000 PSI, Pressure regulator 54 which reduces the pressure to 100 PSI, proportional valve 56 which controls the flow rate of the propellant and flow meter 58. In an embodiment, pressure regulator is a compact, piston-sensing pressure regulator with a short stroke manufactured by Swagelok® but any suitable pressure regulator could be used. In an embodiment, flow meter 58 is an XFM digital mass flow meter from Aalborg Instruments® but any suitable flow meter could be used. Flow meter 58 provides a control signal to electronics 72 as will be explained in further detail in connection with FIG. 5.

A microwave generation system several components for generating and increasing the power of microwaves provided to MET 10. As explained above for FIG. 3A, DRO 60 generates microwaves at approximately 20 GHz frequency and approximately 7 dBm power. The microwaves enter variable attenuator 62 which controls the RF power with 3-30 dB range of attenuation. In an embodiment, variable attenuator 62 is a GaAs MMIC Voltage-Variable Attenuator, 10-40 GHz from Analog Devices® but any suitable variable attenuator that meets the performance requirements could be used. Next, driver amp 64 increases the power to a desired power level before sending the microwave signal to a second attenuator 66 which protects the IMA from power levels that are too high. From attenuator 66, the signal goes to IMA 68, which provides additional amplification and is described in more detail in connection with FIGS. 7 and 8. Finally, microwaves at approximately 20 GHz and approximately 40 dBm are sent to circulator 78 which protects IMA 68 from any reflected power coming off of the thruster. Circulator 78 sends the microwaves to the antenna (not shown) in MET 10. Any microwaves reflected back from MET 10 are sent through attenuator 79 and power detector 80 which provides a control signal to electronics 72 as will be explained in further detail in connection with FIG. 5.

One or more batteries 72 provide power to the apparatus of FIG. 4. In an embodiment, one or more Lithium Ion 14.8V batteries from Tenergy are provided but any suitable battery could be used. Batteries 72 are connected to boost converter 82, which increases the voltage from batteries 72 to approximately +30 V. LDO (low-dropout) regulator 84 provides a variety of voltages to various components of the control system as needed, for example −5V, +5V, +15V and +20V. Electronics board 72 controls the operation of various components within the control system, including proportional valve 56, variable attenuator 62 through inverter 85 and trimmer potentiometer 84, which is used to control the operation of DRO 60. Electronics board 72 also includes a processor 88 for receiving, processing and generating control signals from components of the control system to provide autonomous control of the MET as described in connection with FIG. 5.

Figure 5:
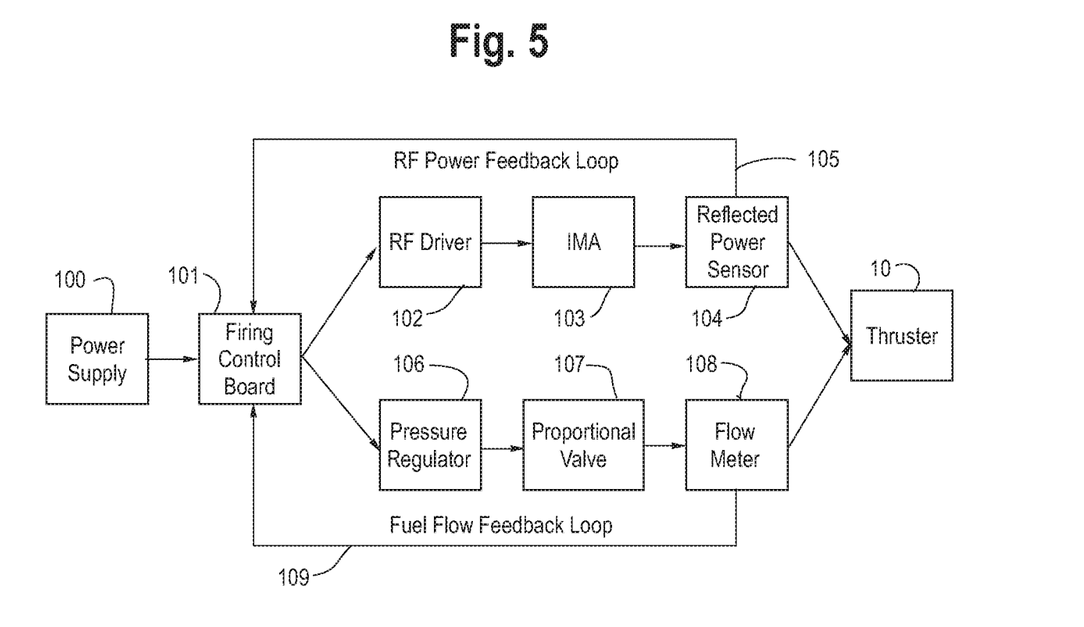
FIG. 5 illustrates the flow control of the MET control system of FIG. 4.

FIG. 5 illustrates the control flow for autonomous firing of the MET of FIGS. 3A, 3B and 4. In general, two feedback loops, one for the propellant system and one for the microwave generation system, provide autonomous control of the MET. In FIG. 5, power supply 100 is connected to firing control board 101, part of electronics boards 72. Firing control board 101 supplies control voltage the microwave generation system, represented as RF driver 102, IMA 103 and reflected power sensor 104. Microwaves from IMA 103 enter circulator 78 (FIG. 4) which passes microwave power into MET 10. If there is reflected power from MET 10, it goes back to circulator 78 and then into a 20 dB load in reflected power sensor 104. A power sensor is at the end of the load and detects a very small amount of power. Reflected power sensor 104 creates a voltage which is read by firing control board 101. In an embodiment, firing control board 101 incorporates processor 88 of FIG. 4 or other logic processing hardware.

Similarly, firing control board 101 uses voltage to control pressure regulator 106 which controls sending gas through proportional valve 107 (corresponding 56 of FIG. 3B), then flow meter 108 (corresponding to 70 of FIG. 3A) and then to thruster 10. Data collected from flow meter 108 is sent back to firing control board 101 through feedback loop 109.

Feedback loops 105 and 109 provide autonomous control of thruster 10. In an embodiment, firing control board 101 maintains a condition wherein as the propellant flow increases, the reflected power decreases, which increases the overall efficiency. In other words, firing control board 82 monitors and adjusts both the propellant flow and the RF power so that a steady state can be achieved. Once the system is at steady state, firing control board 101 slowly increases both RF power and propellant flow to improve efficiency and or thrust. A sudden increase in either variable (RF power or propellant flow) would disrupt the steady state and cause the thruster to fail.

Figures 6A, 6B, 6C:
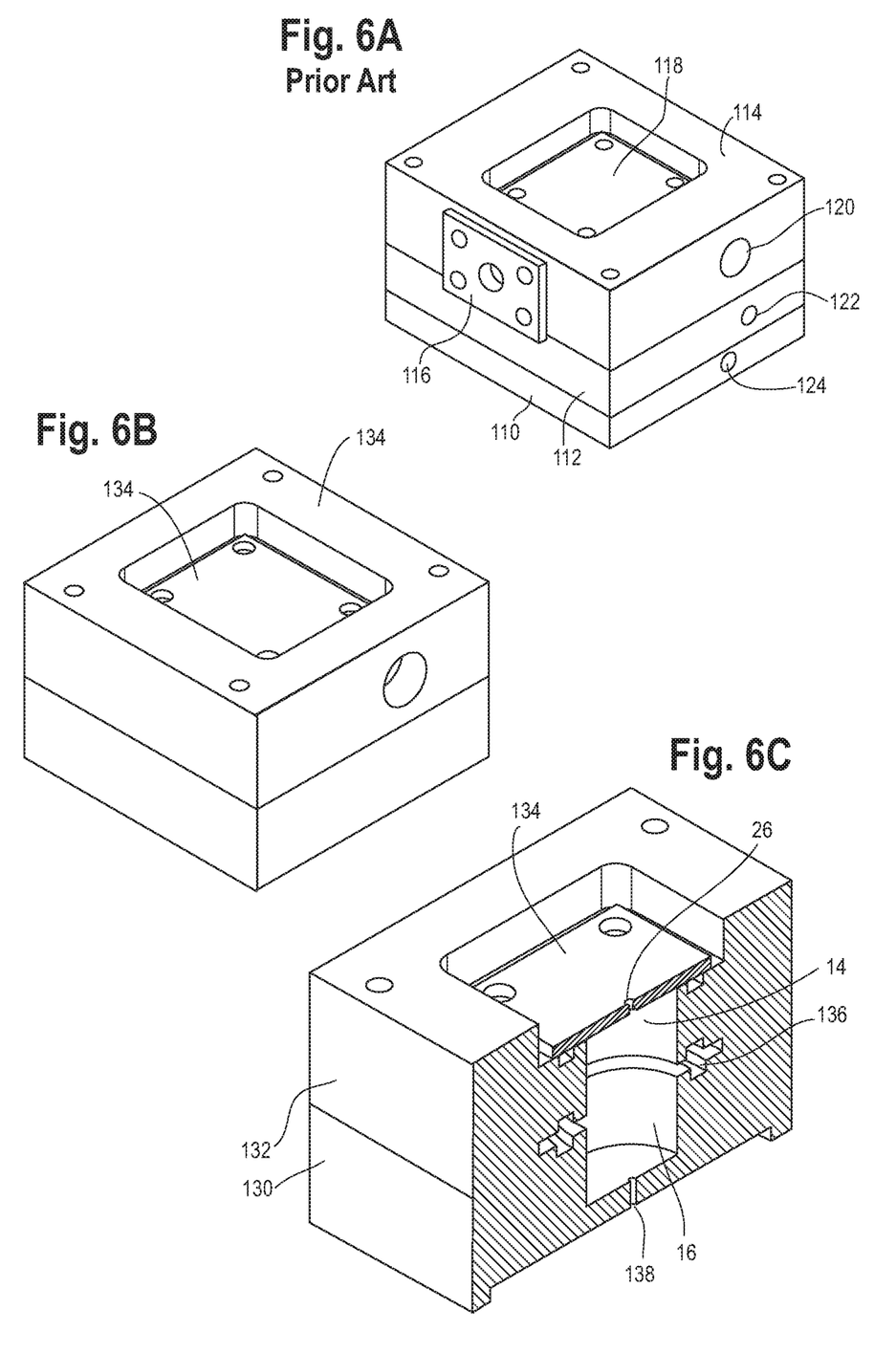
FIG. 6A shows a perspective view of a prior art thruster.
FIG. 6B shows a perspective view of a MET according to the present invention.
FIG. 6C shows a perspective cross-section view of the MET of FIG. 6B.

FIG. 6A shows a perspective view of a prior art thruster. This thruster has a 5 piece design including RF Feedthru plate 110, bottom cavity plate 112, top cavity plate 114, viewport plate 116 and nozzle plate 118. Each of plates 110 and 112 include mounting holes 122 and 124 which are used to attach the thruster to a spacecraft bus or a test stand. Top cavity plate 114 also includes propellant inlet 120. In an embodiment, a corresponding propellant inlet 120 and mounting holes 122 and 124 are located on the opposite side of their respective plate (not shown in FIG. 6A). As noted for FIG. 3A, although two propellant inlets are shown, any number of inlets could be provided depending on a required propellant flow.

FIG. 6B shows a perspective view of a MET according to the present invention. This design only has three pieces, lower chamber plate 130, upper chamber plate 132 and nozzle plate 134. This design holds a vacuum better than the design of FIG. 6A and allows for more efficient RF energy consumption.

FIG. 6C shows a perspective cross-section view of the MET of FIG. 6B. Lower chamber 16 from FIG. 1 is inside body 130, upper chamber 14 is shown inside body 132, nozzle 26 is located in nozzle plate 134. Separation plate 18 of FIG. 1 is not shown but would be located in slot 136. Antenna 22 of FIG. 1 enters lower chamber 16 through port 138.

Figure 7:
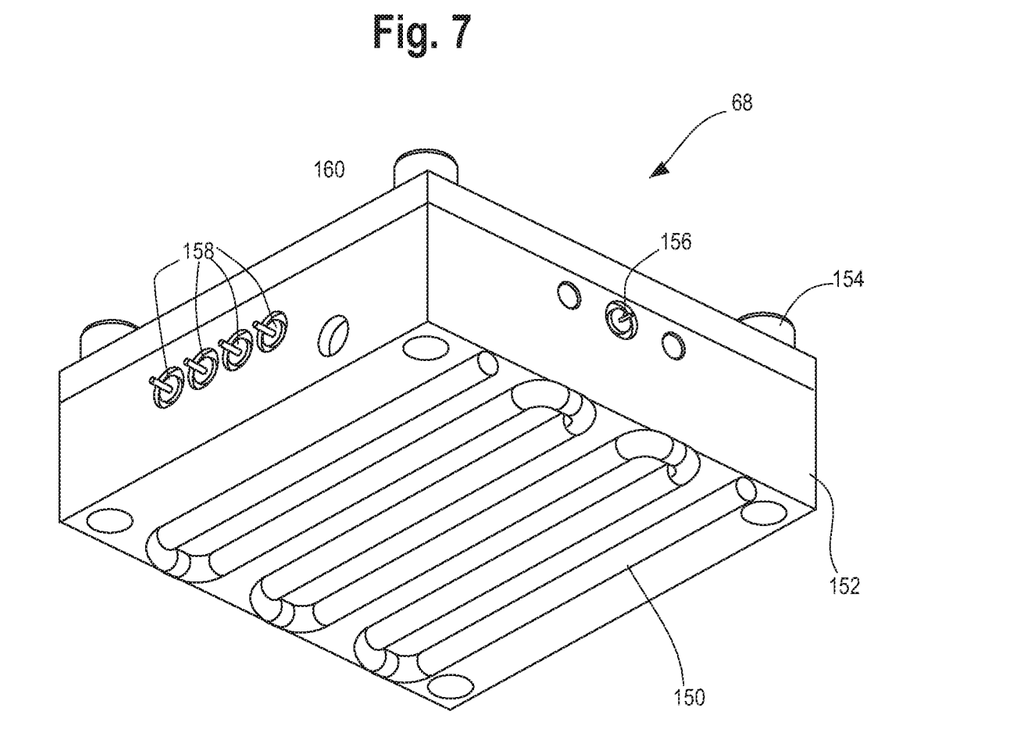
FIG. 7 is an embodiment of the integrated microwave assembly of FIG. 3.

FIG. 7 shows a more detailed view of one embodiment of an IMA 68 of FIG. 3. After propellant from propellant tank 50 passes through pressure regulator 54 and proportional valve 56 of FIG. 4, it is routed through tubes 150 on the bottom of IMA 68 before passing through flow meter 58. This simultaneously heats the propellant for improved ignition, and dissipates heat generated by the IMA. The heat is concentrated on the bottom of the IMA housing 152 where the heat pipes move the heat away. In an embodiment, IMA 68 is a SSPA (Solid State Power Amplifier) that includes a plurality of GaN (gallium arsenide) MIMIC (Monolithic Microwave Integrated Circuit) amplifiers. IMA 68 also consists of DC power feedthrus 158 to provide power to the MIMIC devices. RF Feedthru 156 allows the RF energy to exit the IMA and enter the thruster. IMA Cap 160 is held down by sixteen screws 154.

Figure 8:
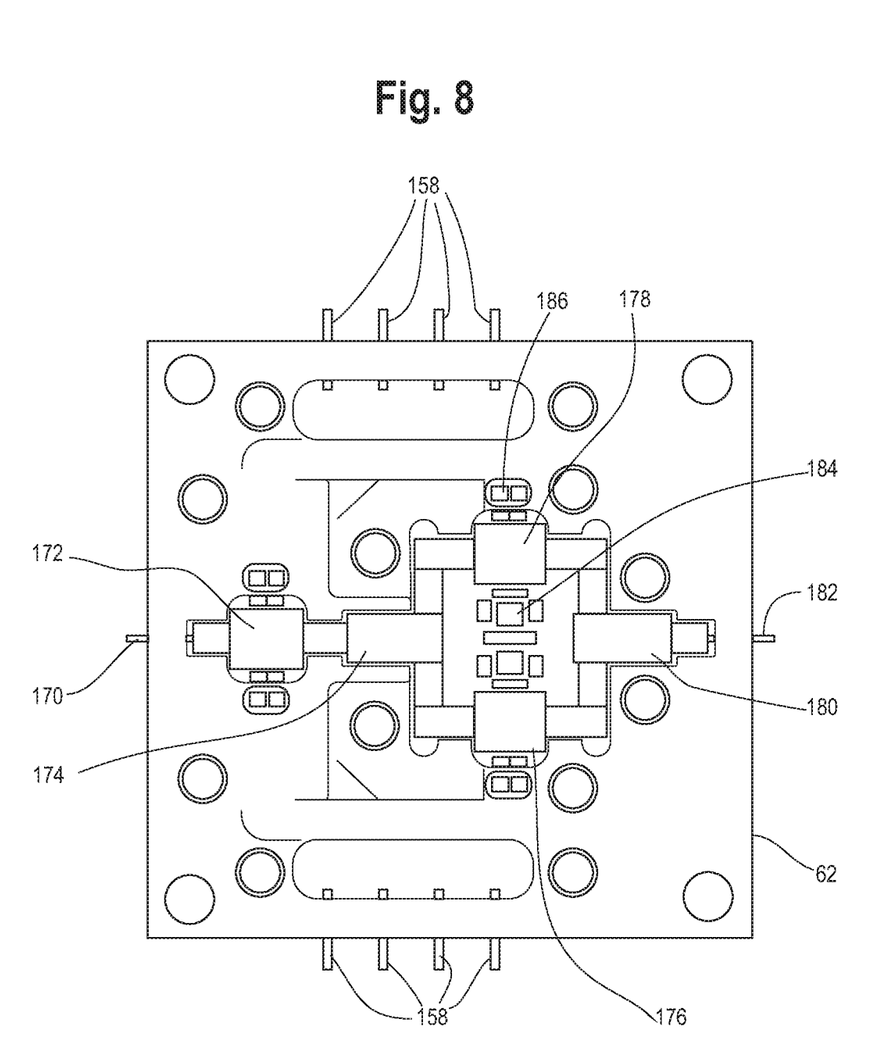
FIG. 8 shows a schematic view of the IMA of FIGS. 3A, 3B and 4.

FIG. 8 shows a schematic view of IMA 68 of FIG. 7. Microwaves from attenuator 66 (FIG. 4) enter IMA 68 at RF feedthru 170. From here they travel through a transmission line to a first MIMIC 172 which increases the microwave power, then to Wilkinson combiner 174. To provide increased power at a reduced footprint, Wilkinson combiner 174 splits the microwaves between MMICs 176 and 178 for further amplification. A second Wilkinson combiner 180 merges the output of MMICs 176 and 178 then sends it to RF feedthru 182 which is connected to circulator 78 (FIG. 4). Capacitors 184 and resistors 186 are used to control the operation of the MIMIC devices. DC power feedthrus 158 on either side of IMA 68 provide power to the MMIC devices. In an embodiment, MMIC 172 increases the power to approximately 30 dBm, Wilkinson combiner 174 provides microwaves at approximately 26 dBm to each of MMICs 176 and 178, which amplify the microwaves to approximately 41 dBm. Wilkinson combiner 180 outputs microwaves at approximately 43 dBm.

Due to its small size and low power requirements, the MET is a practical solution to providing robust propulsion capability for small satellites. Many different propellants may be used in a MET, including hydrazine, ammonia, water, helium and many other well-known substances. In an embodiment, the propellant is provided in the form of a pressurized gas. A MET can be configured into a 1U cubesat providing reasonable delta-V (change in velocity). Each "U" defines the size of the cubesat. A 1U cubesat is 10×10×11.35 mm in size while a 3U cubesat is three 1U cubes stacked together. The METs versatility regarding propellants is a further advantage, and in particular, the ability to utilize "green" propellants such as water, for example. The MET will also enable hitherto difficult to achieve capabilities in small satellites such as six degree-of-freedom agility, collision avoidance, accurate pointing, deorbiting, and atmospheric drag compensation which will extend mission life. The benefits of implementing a small, scalable propulsion system on a small satellite could eventually transfer into large spacecraft, perhaps even rendering reaction wheels obsolete.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A control system for a microwave electrothermal thruster (MET), comprising:
   a propellant system for providing propellant to the MET at a selected pressure and flow rate;
   a microwave generation system for providing microwave energy to the MET at a selected power; and
   an electronics control board for controlling the propellant system and microwave generation system based on system parameters and feedback from the propellant system and microwave generation system, wherein the MET is located on a satellite and the electronics control board provides autonomous control of the MET to adjust a position of the satellite, and wherein the microwave generation system further comprises an oscillator for controlling a power of the microwave energy, an integrated microwave assembly (IMA) for increasing the power of the microwave energy from the oscillator then sending the microwave energy to the MET, a variable attenuator, a driver amplifier, and a further attenuator located between the oscillator and the IMA.

2. The control system of claim 1, wherein the propellant system further comprises:
   a proportional valve for controlling a propellant flow rate of the propellant according to a control signal from the electronics control board; and
   a flow meter for measuring the propellant flow rate of the propellant and providing the control signal to the electronics control board.

3. The control system of claim 1, wherein the oscillator controls the power of the microwave energy according to a control signal from the electronics control board; and
   wherein the microwave generation system further comprises:
   a power sensor for measuring a reflected power from the MET and providing the control signal to the electronics control board.

4. A control system for a microwave electrothermal thruster (MET), comprising:
   a propellant system further comprising:
   a propellant tank; and
   a flow meter coupled to the propellant tank for measuring a flow rate of a propellant as the propellant is supplied to the MET;
   a microwave generation system further comprising:
   an oscillator for generating microwaves;
   an integrated microwave assembly (IMA) for increasing a power of the microwaves from the oscillator then sending the microwaves to the MET; and
   a sensor for monitoring the power of the microwaves sent to the MET; and
   an electronics control board for monitoring the flow meter and the sensor to control operation of the MET, wherein the microwave generation system further comprises, between the oscillator and the IMA:
   a variable attenuator and a driver amplifier, and a further attenuator between the driver amplifier and the IMA.

5. The control system of claim 4, wherein the propellant system further comprises:
   a pressure regulator; and
   a proportional valve for controlling the flow rate of the propellant between the propellant tank and the flow meter.

6. The control system of claim 4, wherein the microwave generation system further comprises:
a circulator for receiving the microwaves from the IMA and transferring the microwaves to the MET and for receiving reflected microwaves from the MET and transferring the reflected microwaves to the sensor.

7. The control system of claim 4, wherein the oscillator is a dielectric resonator oscillator (DRO).

8. The control system of claim 7 wherein the DRO generates the microwaves with a frequency of 20 GHz.

9. The control system of claim 4 wherein the IMA further comprises a plurality of Galium Arsenide Monolithic Microwave Integrated Circuit based Solid State Power Amplifiers (GaN MMIC SSPAs).

10. The control system of claim 9, wherein the IMA further comprises:
a first GaN MMIC SSPA among the plurality of GaN MMIC SSPAs for receiving a first input and providing a first output;
a first Wilkinson combiner receiving the first output from the first GaN MMIC SSPA among the plurality of GaN MMIC SSPAs and providing a second output and a third output;
second and third GaN MMIC SSPAs among the plurality of GaN MMIC SSPAs for receiving the second output and the third output from the first Wilkinson combiner and providing a third output and a fourth output; and
a second Wilkinson combiner for receiving the third output and the fourth output from the second and third GaN MMIC SSPAs among the plurality of GaN MMIC SSPAs and providing a fifth output.

11. The control system of claim 4 wherein the IMA increases the power of the microwaves to 40 dBm.

12. The control system of claim 4 wherein the IMA is cooled by the propellant as the propellant exits the propellant tank.

13. The control system of claim 4, wherein the propellant is a pressurized gas.

14. The control system of claim 4, wherein the propellant is hydrazine, ammonia, water or helium.

15. A system comprising:
a control system according to claim 1, wherein the MET further comprises:
an upper chamber further comprising a plurality of propellant inlets and a nozzle;
a lower chamber separated from the upper chamber by a separation plate and further comprising a microwave energy inlet.

16. A system comprising:
a control system according to claim 4,
wherein the MET further comprises:
an upper chamber further comprising a plurality of propellant inlets and a nozzle;
a lower chamber separated from the upper chamber by a separation plate and further comprising a microwave energy inlet.

17. The system of claim 16, wherein the IMA further comprises:
a first Solid State Power Amplifier (SSPA) for receiving a first input and providing first output;
a first Wilkinson combiner receiving the first output from the first SSPA and providing a second output and a third output;
second and third SSPAs for receiving the second output and the third output from the first Wilkinson combiner and providing a fourth output and a fifth output; and
a second Wilkinson combiner for receiving the fourth output and the fifth output from the second and third SSPAs and providing a sixth output.

18. A satellite comprising:
a control system according to claim 1 for autonomously controlling the MET.

\* \* \* \* \*